United States Patent
Ikeda et al.

(10) Patent No.: US 9,796,593 B2
(45) Date of Patent: Oct. 24, 2017

(54) POLYCRYSTALLINE DIAMOND AND MANUFACTURING METHOD THEREOF

(75) Inventors: Kazuhiro Ikeda, Itami (JP); Keiko Arimoto, Itami (JP); Katsuko Yamamoto, Itami (JP); Hitoshi Sumiya, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 524 days.

(21) Appl. No.: 14/235,758

(22) PCT Filed: Jul. 26, 2012

(86) PCT No.: PCT/JP2012/068930
§ 371 (c)(1),
(2), (4) Date: Jan. 28, 2014

(87) PCT Pub. No.: WO2013/015347
PCT Pub. Date: Jan. 31, 2013

(65) Prior Publication Data
US 2014/0170055 A1    Jun. 19, 2014

(30) Foreign Application Priority Data

Jul. 28, 2011  (JP) ................. 2011-165744
Jul. 28, 2011  (JP) ................. 2011-165745
Jul. 28, 2011  (JP) ................. 2011-165746

(51) Int. Cl.
*B01J 3/06* (2006.01)
*C01B 31/06* (2006.01)

(52) U.S. Cl.
CPC .............. *C01B 31/06* (2013.01); *B01J 3/062* (2013.01); *B01J 2203/061* (2013.01); *B01J 2203/0655* (2013.01)

(58) Field of Classification Search
None
See application file for complete search history.

(56) References Cited

U.S. PATENT DOCUMENTS

| 5,540,904 A * | 7/1996 | Bovenkerk ............. B01J 3/062 117/929 |
| 2005/0019114 A1 * | 1/2005 | Sung ..................... B21C 3/025 407/119 |

(Continued)

FOREIGN PATENT DOCUMENTS

| CN | 101660137 A | 3/2010 |
| JP | 03-088707 A | 4/1991 |

(Continued)

OTHER PUBLICATIONS

Translation of Irifune et al. Japanese Pub. No. 2003-292397.*

(Continued)

*Primary Examiner* — Guinever S Gregorio
(74) *Attorney, Agent, or Firm* — Venable LLP; Michael A. Sartori; Miguel A. Lopez

(57) ABSTRACT

Nano polycrystalline diamond is composed of carbon and a plurality of impurities other than carbon. A concentration of each of the plurality of impurities is not higher than 0.01 mass %, and the nano polycrystalline diamond has a crystal grain size (a maximum length) not greater than 500 nm. The nano polycrystalline diamond can be fabricated by preparing graphite in which a concentration of an impurity is not higher than 0.01 mass % and converting graphite to diamond by applying an ultra-high pressure and a high temperature to graphite.

9 Claims, 5 Drawing Sheets

(56) References Cited

U.S. PATENT DOCUMENTS

2009/0305039 A1* 12/2009 Sumiya .................. B01J 3/062
428/402
2010/0146865 A1    6/2010 Sato et al.

FOREIGN PATENT DOCUMENTS

| JP | 05-194089 A | 8/1993 |
|---|---|---|
| JP | 08-141385 A | 6/1996 |
| JP | 10-045473 A | 2/1998 |
| JP | 2003-292397 A | 10/2003 |
| JP | 2004-538230 A | 12/2004 |
| JP | 2007-055819 A | 3/2007 |
| JP | 2009-067609 A | 4/2009 |
| WO | WO-03/014427 A1 | 2/2003 |
| WO | WO-2009/099130 A1 | 8/2009 |

OTHER PUBLICATIONS

Notification of the First Office Action in Chinese Application No. 2012800374140, dated Feb. 13, 2015.
Office Action in U.S. Appl. No. 15/131,971, dated May 8, 2017 [Related application, provided in IFW].
Irifune et al., "Formation of Pure Polycrystalline Diamond by Direct Conversion of Graphite at High Pressure and High Termperature," Physics of the Earth and Planetary Interiors, 143-144, pp. 593-600, 2004.
H. Sumiya, "Thermally activated deformation under Knoop indentations in super-hard directions of high-quality synthetic type-IIa diamond crystals," Diamond and Related Materials, 15 (2006), pp. 1576-1579.
J. R. Maze et al., "Nanoscale magnetic sensing with an individual electronic spin in diamond," Nature, vol. 455 (2008), pp. 644-647.
T. R. Anthony et al., "The thermal conductivity of isotopically enriched polycrystalline diamond films," Journal of Applied Physics 69 (12), Jun. 1991, pp. 8122-8125.
T. R. Anthony et al., "Properties of diamond with varying isotopic composition," Diamond and Related Materials, 1 (1992), pp. 717-726.
International Search Report in PCT International Application No. PCT/JP2012/068930, dated Oct. 30, 2012.

* cited by examiner

POLYCRYSTALLINE DIAMOND AND MANUFACTURING METHOD THEREOF

TECHNICAL FIELD

The present invention relates to polycrystalline diamond and a manufacturing method thereof, and particularly to polycrystalline diamond having a crystal grain of a nano size (hereinafter referred to as "nano polycrystalline diamond") and a manufacturing method thereof, nano polycrystalline diamond which can be made use of for magnetic sensing and a manufacturing method thereof, and nano polycrystalline diamond having excellent thermal conductivity and a manufacturing method thereof.

BACKGROUND ART

It has recently been clarified that a nano polycrystalline diamond sintered object has hardness exceeding natural single-crystal diamond and has a property excellent as a tool. Hardness of the nano polycrystalline diamond sintered object is approximately from 120 to 130 GPa expressed in Knoop hardness. One example of such polycrystalline diamond is described, for example, in Japanese Patent Laying-Open No. 2003-292397 and Diamond and Related Materials, 15 (2006), pp. 1576 to 1579.

On the other hand, needs for a small tool and a tool having high wear resistance have increased, and a diamond material having higher hardness has been demanded.

In addition, it has been known that magnetic sensing can be carried out by making use of an NV (Nitrogen-Vacancy) center in the inside of diamond. For example, J. R. Maze et al., "Nanoscale magnetic sensing with an individual electronic spin in diamond," Nature, Vol. 455, pp. 644 to 647 (2008) has made a report on magnetic sensing making use of an individual electron spin in diamond.

It has recently be clarified that a nano polycrystalline diamond sintered object has hardness exceeding natural single-crystal diamond and has a property excellent as a tool. Hardness of the nano polycrystalline diamond sintered object is approximately from 120 to 130 GPa expressed in Knoop hardness. One example of such nano polycrystalline diamond is described, for example, in Japanese Patent Laying-Open No. 2003-292397 and Diamond and Related Materials, 15 (2006), pp. 1576 to 1579.

In addition, needs for a small tool and a tool having high wear resistance have increased, and a diamond material having higher hardness has been demanded. One example of such a high-hardness diamond polycrystalline body is described, for example, in Japanese Patent Laying-Open No. 2007-55819.

On the other hand, reports paying attention to thermal conductivity of diamond have also been made. For example, J. Appl. Phys. 69 (12), 15 Jun. 1991, pp. 8122 to 8125 has made a report on thermal conductivity of an isotopically enriched polycrystalline diamond film, and Diamond and Related Materials, 1 (1992), pp. 717 to 726 has reported characteristics of diamond when isotopic composition is varied.

CITATION LIST

Patent Document

PTD 1: Japanese Patent Laying-Open No. 2003-292397
PTD 2: Japanese Patent Laying-Open No. 2007-55819

Non Patent Document

NPD 1: Diamond and Related Materials, 15 (2006), pp. 1576 to 1579
NPD 2: J. R. Maze et al., "Nanoscale magnetic sensing with an individual electronic spin in diamond," Nature, Vol. 455, pp. 644 to 647 (2008)
NPD 3: J. Appl. Phys. 69 (12), 15 Jun. 1991, pp. 8122 to 8125
NPD 4: Diamond and Related Materials, 1 (1992), pp. 717 to 726

SUMMARY OF INVENTION

Technical Problem

Single-crystal diamond includes what is called IIa-type diamond and Ib-type diamond. The IIa-type diamond is high-purity diamond containing substantially no nitrogen representing an impurity, and the Ib-type diamond is an impurity-containing diamond containing nitrogen representing an impurity by approximately 0.1%. It has been known that IIa-type diamond is harder than Ib-type diamond based on comparison of hardness of these diamonds. It is thus estimated that hardness of single-crystal diamond can be increased by decreasing an amount of impurity in single-crystal diamond so as to achieve higher purity.

Though the case of single-crystal diamond is considered as also similarly applicable to the case of nano polycrystalline diamond, in the case of nano polycrystalline diamond, it is difficult to achieve higher purity as in the case of single-crystal diamond. This is because, in the step of synthesizing nano polycrystalline diamond, many impurities represented by Si, B, H, and N are normally introduced in diamond.

Though nano polycrystalline diamond can be synthesized, for example, by direct conversion from graphite to diamond, commercially available graphite is made of coke or pitch and hence it is difficult to avoid introduction of an impurity in graphite. Therefore, an impurity will be taken also in nano polycrystalline diamond synthesized with that method. In addition, even though purity of graphite is made higher, it is difficult with the state of the art to remove an impurity introduced during manufacturing of graphite. An impurity which has not completely been removed segregates at a crystal grain boundary of a synthesized diamond crystal of a nano size, and the diamond crystal tends to slip at the crystal grain boundary, which interferes increase in hardness of nano polycrystalline diamond. As above, with the conventional technique, increase in purity and hardness of nano polycrystalline diamond has been limited.

Another problem is that, due to presence of a large amount of impurity in diamond, the impurity will adversely affect intensity of fluorescence of a NV center and also increase a width of a resonance line which determines sensitivity, and resultant lowering in accuracy in magnetic sensing is concerned.

In the conventional step of synthesizing polycrystalline diamond, many impurities represented by hydrogen, nitrogen, silicon, and boron are introduced in diamond. Though nano polycrystalline diamond can be synthesized, for example, by direct conversion from graphite to diamond, commercially available graphite is made of coke or pitch and hence it is difficult to avoid introduction of an impurity in graphite. Therefore, an impurity will be taken also in polycrystalline diamond synthesized with that method. In addition, even though purity of graphite is made higher, it is difficult with the state of the art to remove an impurity introduced during manufacturing of graphite. An impurity which has not completely been removed segregates at a crystal grain boundary of a synthesized diamond crystal.

Thus, since resultant polycrystalline diamond contains many impurities, it has been considered as difficult to fabricate a substrate suitable for magnetic sensing with polycrystalline diamond. It has been considered as very difficult in particular in the case of nano polycrystalline diamond having small crystal grains of a nano size.

Yet another problem is that scattering of phonons is significant since nano polycrystalline diamond has a small crystal grain size. Therefore, it has been found that thermal conductivity of nano polycrystalline diamond is lower than thermal conductivity of single-crystal diamond or common polycrystalline diamond.

On the other hand, it has been known that single-crystal diamond has higher thermal conductivity as a concentration of a carbon isotope is higher. Polycrystalline diamond fabricated with a chemical vapor deposition (CVD) method, however, will not be higher in thermal conductivity even when a concentration of a carbon isotope is higher. Therefore, it has been considered that an effect by an isotope is not expressly appeared in polycrystalline diamond and thermal conductivity does not become higher.

As above, it has been difficult to improve thermal conductivity of nano polycrystalline diamond even though a concentration of a carbon isotope is higher.

The present invention was made in view of the problems as described above, and one object is to provide nano polycrystalline diamond having high purity and high hardness and a manufacturing method thereof.

Another object of the present invention is to provide nano polycrystalline diamond which can be served for magnetic sensing and a manufacturing method thereof.

Yet another object of the present invention is to provide polycrystalline diamond excellent in thermal conductivity and a manufacturing method thereof.

Solution to Problem

Polycrystalline diamond according to the present invention is diamond having high purity at an unprecedented level (for example, a level which could not conventionally be achieved by mixing powders and subjecting the powders to heating treatment or the like). Specifically, polycrystalline diamond is composed of carbon and a plurality of impurities other than carbon. The polycrystalline diamond has a concentration of each of the plurality of impurities not higher than 0.01 mass % and a crystal grain size (a maximum length) not greater than 500 nm.

The polycrystalline diamond above is extremely low in impurity concentration in its entirety. In the polycrystalline diamond according to the present invention, segregation of an impurity as in the conventional example is not observed, and an impurity concentration in any portion is extremely low. In addition, a concentration of the impurities at a crystal grain boundary is also approximately not higher than 0.01 mass %. Since an impurity concentration is thus extremely low, Knoop hardness of the polycrystalline diamond is also high, and for example, the polycrystalline diamond has Knoop hardness not lower than 150 GPa.

The plurality of impurities include hydrogen, oxygen, nitrogen, silicon, and boron. In the polycrystalline diamond, a concentration of hydrogen is, for example, approximately not higher than $2 \times 10^{18}/cm^3$, a concentration of oxygen is, for example, approximately not higher than $2 \times 10^{17}/cm^3$, a concentration of nitrogen is, for example, approximately not higher than $4 \times 10^{16}/cm^3$, a concentration of silicon is, for example, approximately not higher than $1 \times 10^{16}/cm^3$, and a concentration of boron is, for example, approximately not higher than $2 \times 10^{15}/cm^3$.

The polycrystalline diamond above can be fabricated by sintering graphite obtained by direct thermal decomposition of hydrocarbon having purity not lower than 99.99%, at a temperature not lower than 1500° C.

A method for manufacturing polycrystalline diamond according to the present invention includes the steps of preparing graphite in which a concentration of an impurity is not higher than 0.01 mass % and converting the graphite to diamond by subjecting the graphite to heat treatment at an ultra-high pressure and a high temperature.

In the step of converting the graphite to diamond, the graphite is preferably converted to diamond at a high temperature and a high pressure without adding a sintering aid or a catalyst. In addition, the step of preparing graphite may include the step of forming graphite on a base material by thermal decomposition of a hydrocarbon gas having purity not lower than 99.99% and introduced in a vacuum chamber, at a temperature not lower than 1500° C. Moreover, in the step of converting the graphite to diamond, diamond can be synthesized by initially loading graphite formed on the base material into a vacuum chamber, subjecting graphite to heat treatment in the vacuum chamber, and then keeping graphite subjected to heat treatment under conditions of a high pressure not lower than 12 GPa and a high temperature not lower than 1500° C.

For example, hydrogen, oxygen, nitrogen, silicon, and boron can be exemplified as impurities in graphite above. A concentration of these impurities is theoretically the same as a concentration of impurities contained in resultant polycrystalline diamond.

In another aspect, polycrystalline diamond according to the present invention is diamond which is composed substantially of a specific carbon isotope, is a polycrystalline body, and can be used for magnetic sensing. Specifically, polycrystalline diamond is composed of carbon in which purity of a carbon isotope $^{12}C$ is not lower than 99.9 mass % and a plurality of impurities other than carbon. The polycrystalline diamond has a concentration of each of the plurality of impurities not higher than 0.01 mass % and a crystal grain size (a maximum length) not greater than 500 nm.

The polycrystalline diamond above has a small crystal grain size, contains a carbon isotope $^{12}C$ of high purity, and is extremely low in impurity concentration in its entirety. In the polycrystalline diamond according to the present invention, segregation of an impurity as in the conventional example is not observed, and an impurity concentration in any portion is extremely low. Therefore, a concentration of the impurities at a crystal grain boundary is also approximately not higher than 0.01 mass %. Since an impurity concentration is thus extremely low and a crystal grain size is small, Knoop hardness of the polycrystalline diamond is also high and for example, the polycrystalline diamond has Knoop hardness not lower than 150 GPa.

For example, hydrogen, oxygen, nitrogen, silicon, and boron can be exemplified as the plurality of impurities above. In polycrystalline diamond, a concentration of hydrogen is, for example, approximately not higher than $2 \times 10^{18}/cm^3$, a concentration of oxygen is, for example, approximately not higher than $2 \times 10^{17}/cm^3$, a concentration of nitrogen is, for example, approximately not higher than $4 \times 10^{16}/cm^3$, a concentration of silicon is, for example, approximately not higher than $1 \times 10^{16}/cm^3$, and a concentration of boron is, for example, approximately not higher than $2 \times 10^{15}/cm^3$.

The polycrystalline diamond above can be fabricated by sintering graphite obtained by thermal decomposition of hydrocarbon in which purity of a carbon isotope $^{12}C$ is not lower than 99.9 mass %, at a temperature not lower than 1500° C.

In another aspect, a method for manufacturing polycrystalline diamond according to the present invention includes the steps of preparing graphite obtained by thermal decomposition of a hydrocarbon gas of which purity of a carbon isotope $^{12}C$ is not lower than 99.9 mass % and of which chemical purity is not lower than 99 mass % and converting the graphite to diamond by subjecting the graphite to heat treatment within high-temperature and high-pressure press equipment.

In the step of converting the graphite to diamond, the graphite is preferably subjected to heat treatment at a high pressure without adding a sintering aid or a catalyst. In addition, the step of preparing graphite may include the step of forming graphite on a base material by thermal decomposition of the hydrocarbon gas introduced in a vacuum chamber, preferably at a temperature not lower than 1500° C. Moreover, in the step of converting the graphite to diamond, the graphite formed on the base material may be subjected to heat treatment at a high pressure not lower than 7 GPa and at 1500° C. or higher. The graphite preferably has bulk density not lower than 1.4 $g/cm^3$.

In yet another aspect, polycrystalline diamond according to the present invention is diamond composed substantially of a specific carbon isotope and having thermal conductivity and a crystal grain size at an unprecedented level. Specifically, polycrystalline diamond is composed of carbon composed substantially of any carbon isotope of $^{12}C$ and $^{13}C$ and a plurality of impurities other than carbon, and the polycrystalline diamond has a concentration of each of the plurality of impurities not higher than 0.01 mass % and a crystal grain size (a maximum length) not greater than 500 nm.

The polycrystalline diamond above has a small crystal grain size, contains $^{12}C$ or $^{13}C$ of high purity, and is extremely low in impurity concentration in its entirety. In the polycrystalline diamond according to the present invention, segregation of an impurity as in the conventional example is not observed, and an impurity concentration in any portion is extremely low. Therefore, a concentration of the impurities at a crystal grain boundary is approximately not higher than 0.01 mass %. Since an impurity concentration is thus extremely low and a crystal grain size is small, Knoop hardness of the polycrystalline diamond is also high and for example, the polycrystalline diamond has Knoop hardness not lower than 140 GPa.

For example, hydrogen, oxygen, nitrogen, silicon, and boron can be exemplified as the plurality of impurities above. In polycrystalline diamond, a concentration of hydrogen is, for example, approximately not higher than $2 \times 10^{18}/cm^3$, a concentration of oxygen is, for example, approximately not higher than $2 \times 10^{17}/cm^3$, a concentration of nitrogen is, for example, approximately not higher than $4 \times 10^{16}/cm^3$, a concentration of silicon is, for example, approximately not higher than $1 \times 10^{16}/cm^3$, and a concentration of boron is, for example, approximately not higher than $2 \times 10^{15}/cm^3$.

The polycrystalline diamond above can be fabricated by sintering graphite obtained by thermal decomposition of hydrocarbon in which purity of a carbon isotope $^{12}C$ or $^{13}C$ is not lower than 99.9 mass %, at a temperature not lower than 1500° C.

In yet another aspect, a method for manufacturing polycrystalline diamond according to the present invention includes the steps of preparing graphite obtained by thermal decomposition of a hydrocarbon gas of which purity of a carbon isotope $^{12}C$ or $^{13}C$ is not lower than 99.9 mass % and converting the graphite to diamond by subjecting the graphite to heat treatment within high-pressure press equipment.

In the step of converting the graphite to diamond, the graphite is preferably subjected to heat treatment within the high-pressure press equipment without adding a sintering aid or a catalyst. In addition, the step of preparing graphite may include the step of forming graphite on a base material by thermal decomposition of the hydrocarbon gas introduced in a vacuum chamber, at a temperature not lower than 1500° C. Moreover, in the step of converting the graphite to diamond, the graphite formed on the base material may be subjected to heat treatment at a high pressure not lower than 7 GPa and at 1500° C. or higher. The graphite preferably has bulk density not lower than 1.4 $g/cm^3$.

Advantageous Effects of Invention

Since a concentration of an impurity contained in polycrystalline diamond according to the present invention is not higher than 0.01 mass %, nano polycrystalline diamond having unprecedentedly high hardness is obtained.

Since graphite is converted to diamond by subjecting graphite in which a concentration of an impurity is not higher than 0.01 mass % to heat treatment in the method for manufacturing polycrystalline diamond according to the present invention, nano polycrystalline diamond having unprecedentedly high purity and high hardness can be fabricated.

In polycrystalline diamond according to another aspect of the present invention, since a concentration of a carbon isotope $^{12}C$ in carbon is set as high as to 99.9 mass % or higher and a concentration of each impurity in diamond is extremely low, that is, not higher than 0.01 mass %, as compared with conventional polycrystalline diamond, magnetic sensing making use of an NV center can be carried out.

In the method for manufacturing polycrystalline diamond according to another aspect of the present invention, since graphite (solid carbon) of which purity of carbon isotope $^{12}C$ is not lower than 99.9 mass % and of which chemical purity is not lower than 99 mass % is prepared by thermal decomposition of a hydrocarbon gas of which purity of carbon isotope $^{12}C$ is not lower than 99.9 mass % and of which chemical purity is not lower than 99 mass % and the graphite is converted to diamond by being subjected to heat treatment, polycrystalline diamond containing a high-purity carbon isotope $^{12}C$, in which an impurity concentration is extremely low, can be fabricated. Namely, polycrystalline diamond capable of magnetic sensing making use of an NV center can be fabricated.

According to yet another aspect of the present invention, since polycrystalline diamond is composed substantially of any carbon isotope of $^{12}C$ and $^{13}C$ and a concentration of an impurity is not higher than 0.01 mass %, nano polycrystalline diamond having unprecedentedly excellent thermal conductivity is obtained.

In the method for manufacturing polycrystalline diamond according to yet another aspect of the present invention, since graphite (solid carbon) is prepared by thermal decomposition of a hydrocarbon gas in which purity of carbon isotope $^{12}$C or $^{13}$C is not lower than 99.9 mass % and graphite is converted to diamond by being subjected to heat treatment, nano polycrystalline diamond having unprecedentedly excellent thermal conductivity can be fabricated.

DESCRIPTION OF EMBODIMENTS

An embodiment of the present invention will be described hereinafter with reference to FIGS. 1 to 3.

Nano polycrystalline diamond in the present embodiment is extremely small in an amount of an impurity. Here, an "impurity" herein refers to an element other than carbon. Though nano polycrystalline diamond typically contains a plurality of inevitable impurities, in nano polycrystalline diamond in the present embodiment, a concentration of each impurity is not higher than 0.01 mass %.

Figure 1:
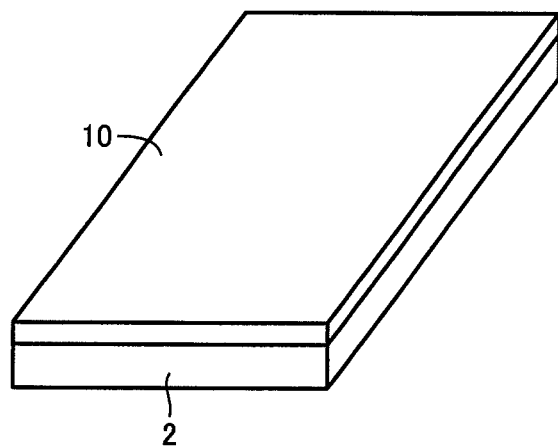
FIG. 1 is a perspective view showing how nano polycrystalline diamond in one embodiment of the present invention is fabricated from graphite formed on a base material.
Figure 1:
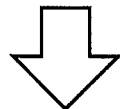
Figure 1:
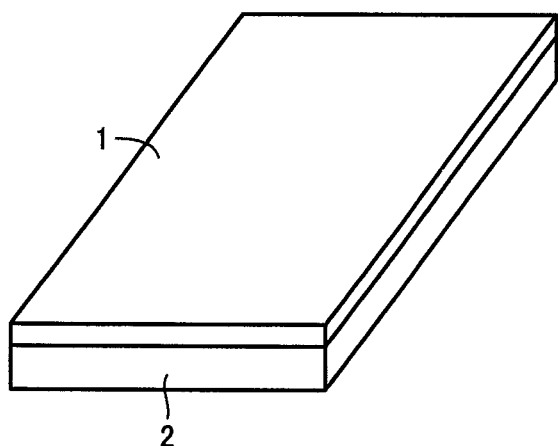

As shown in FIG. 1, nano polycrystalline diamond 1 in the present embodiment is formed on a base material 2. Nano polycrystalline diamond 1 can be fabricated by subjecting graphite 10 formed on base material 2 to heat treatment. Graphite 10 is an integral solid and contains a crystallized portion. In an example in FIG. 1, though polycrystalline diamond 1 and graphite 10 have a shape like a flat plate, it is possible that they have any shape and thickness.

An impurity introduced in graphite is exemplified by nitrogen, hydrogen, oxygen, boron, silicon, such a transition metal as promoting growth of crystal grains, and the like. Nitrogen is great in an amount of precipitation at a crystal grain boundary and a concentration at the crystal grain boundary is also normally several hundred ppm in a conventional example. Thus, crystal grains tend to slip at the crystal grain boundary. Hydrogen is stabilized by sp2 bond at the crystal grain boundary, which consequently lowers hardness of graphite. Since a source material for graphite is coke or pitch as described above in a diamond sintered object fabricated with conventional graphite, hydrogen in an amount of approximately several hundred ppm is inevitably introduced in graphite in spite of treatment for highly purifying the same. Oxygen is likely to react with carbon, and in addition, it forms an oxide with boron and promotes local growth of crystal grains. In addition, nitrogen and boron cause slip of crystal grains at the crystal grain boundary, which interferes with increase in hardness up to essential hardness limit.

In graphite used for fabricating nano polycrystalline diamond in the present embodiment, an amount of an impurity such as nitrogen, hydrogen, oxygen, boron, silicon, and a transition metal is 0.01 mass % or lower. Namely, a concentration of an impurity in graphite is approximately not higher than a detection limit in SIMS (Secondary Ion Mass Spectrometry) analysis. In addition, a concentration of a transition metal in graphite is approximately not higher than a detection limit in ICP (Inductively Coupled Plasma) analysis or SIMS analysis.

Thus, in the case that an amount of an impurity in graphite is lowered down to a level of the detection limit in SIMS analysis or ICP analysis and diamond is made of graphite, diamond having extremely high purity and high hardness can be fabricated. It is noted that, even when graphite containing an impurity slightly more than the detection limit in SIMS analysis or ICP analysis is employed, diamond having characteristics significantly better than in a conventional example is obtained.

In nano polycrystalline diamond in the present embodiment, a concentration of an impurity is extremely low in its entirety. In addition, in the nano polycrystalline diamond, segregation of an impurity as in the conventional example is not observed and a concentration of an impurity in any portion is also extremely low. Moreover, a concentration of an impurity at a crystal grain boundary is also approximately not higher than 0.01 mass %. Since a concentration of an impurity at the crystal grain boundary is thus extremely low, slip of crystal grains at the crystal grain boundary can be suppressed and bond between crystal grains can be strengthened. Polycrystalline diamond can thus have high Knoop hardness. Furthermore, abnormal growth of crystal grains can also effectively be suppressed and variation in size of crystal grains can also be lessened.

In the case that nano polycrystalline diamond in the present embodiment contains, for example, hydrogen, oxygen, nitrogen, silicon, and boron, in the nano polycrystalline diamond, a concentration of hydrogen is approximately not higher than $2 \times 10^{18}$/cm$^3$, a concentration of oxygen is approximately not higher than $2 \times 10^{17}$/cm$^3$, a concentration of nitrogen is approximately not higher than $4 \times 10^{16}$/cm$^3$, a concentration of silicon is approximately not higher than $1 \times 10^{16}$/cm$^3$, and a concentration of boron is approximately not higher than $2 \times 10^{15}$/cm$^3$. Preferably, in the nano polycrystalline diamond, a concentration of hydrogen is approximately not higher than $5 \times 10^{17}$/cm$^3$, a concentration of oxygen is approximately not higher than $1 \times 10^{17}$/cm$^3$, a concentration of nitrogen is approximately not higher than $1 \times 10^{16}$/cm$^3$, a concentration of silicon is approximately not higher than $5 \times 10^{15}$/cm$^3$, and a concentration of boron is approximately not higher than $7 \times 10^{14}$/cm$^3$.

A crystal grain size (a maximum length) of the nano polycrystalline diamond in the present embodiment is not greater than 500 nm. More specifically, the nano polycrystalline diamond has a crystal grain size (a maximum length) approximately from 10 to 100 nm.

Figure 2:
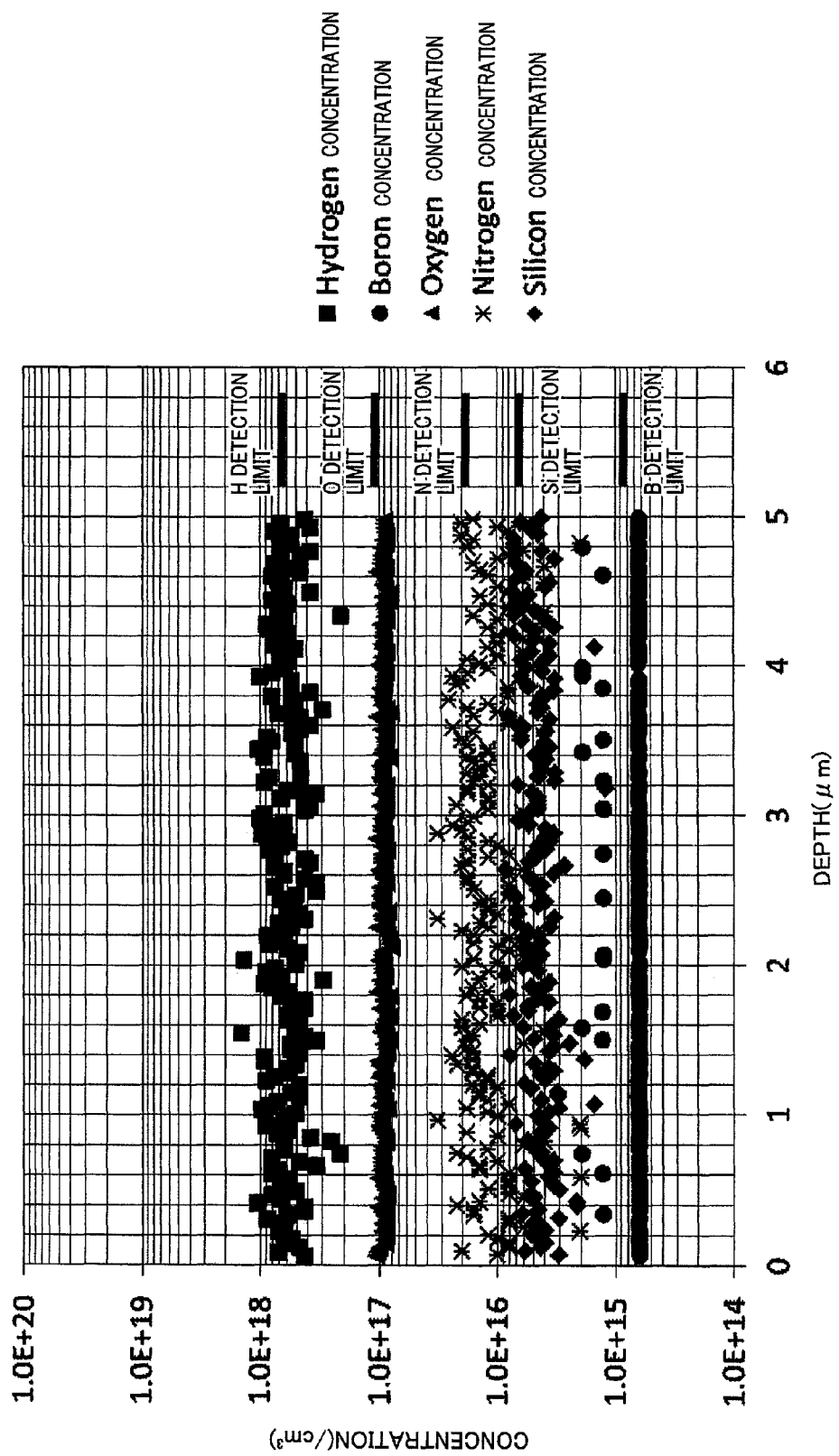
FIG. 2 is a diagram showing one example of distribution of an impurity in nano polycrystalline diamond in one embodiment of the present invention.

FIG. 2 shows one example of distribution of an impurity in nano polycrystalline diamond in one embodiment of the present invention. FIG. 3 shows one example of distribution of an impurity in nano polycrystalline diamond fabricated with a conventional high-purity graphite material, as a comparative example.

Figure 3:
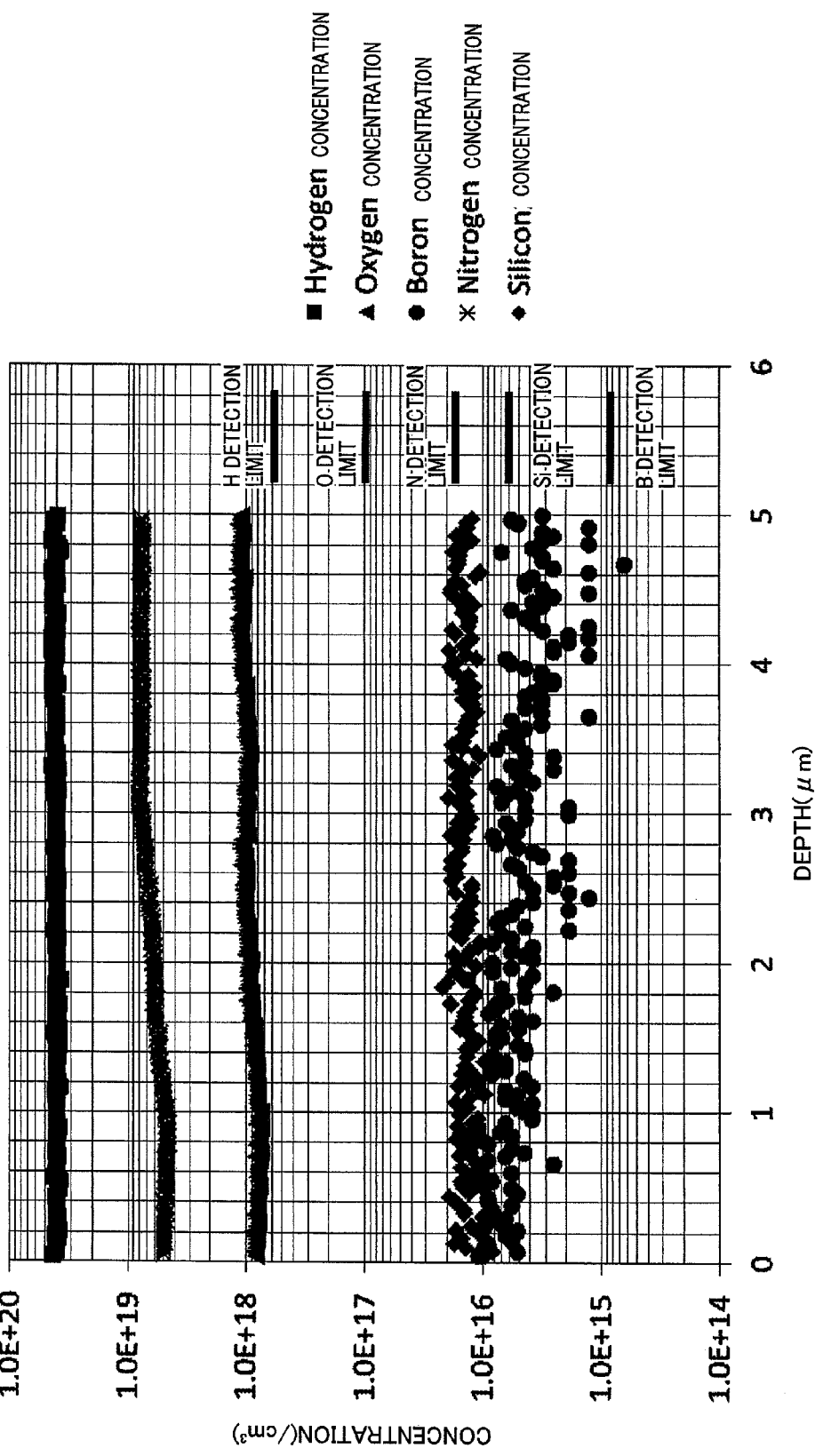
FIG. 3 is a diagram showing one example of distribution of an impurity in nano polycrystalline diamond fabricated with a conventional high-purity graphite material.

As shown in FIGS. 2 and 3, it can be seen that, in any diamond, though variation in concentration of each impurity in a direction of depth of diamond is relatively less, an amount of an impurity in the nano polycrystalline diamond in the present embodiment is at an extremely low value. Since an amount of an impurity in nano polycrystalline diamond can thus be small, as described in each Example which will be described later, nano polycrystalline diamond can have extremely high Knoop hardness, for example, as high as approximately 150 GPa or higher.

Bulk density of graphite is desirably, for example, not lower than 0.8 g/cm$^3$. Preferably, bulk density of graphite is not lower than 1.4 g/cm$^3$. By setting density as such, volume change due to compression during a high-temperature and high-pressure process can be suppressed to be small, and not only temperature control is facilitated but also yield can be improved.

A method for manufacturing nano polycrystalline diamond in the present embodiment will now be described.

Nano polycrystalline diamond according to the present embodiment can be fabricated, for example, by subjecting graphite in which a concentration of an impurity is not higher than 0.01 mass % to heat treatment in a vacuum chamber and converting graphite to diamond. Namely, nano polycrystalline diamond according to the present embodiment can be fabricated by subjecting carbon in a solid phase and extremely low in impurity concentration to heat treatment in a vacuum atmosphere.

Graphite may be fabricated within the vacuum chamber before fabrication of nano polycrystalline diamond, or graphite formed in advance on a base material or the like may separately be prepared and stored. In the case that graphite is fabricated in the vacuum chamber before fabrication of nano polycrystalline diamond, initially, a base material may be set in the vacuum chamber, graphite may be fabricated on the base material, and graphite may subsequently be subjected to heat treatment in the same vacuum chamber. In addition, this graphite can be transported to a glove box connected to the vacuum chamber, and packed and sealed in a pressure cell therein. In this case, graphite and source materials for nano polycrystalline diamond can continuously be sealed in the vacuum chamber and introduction of an impurity into diamond can further effectively be suppressed.

Graphite can be formed on the base material by thermal decomposition of a hydrocarbon gas introduced in the vacuum chamber, of which purity is not lower than 99.99%, at a temperature approximately not lower than 1500° C. and not higher than 3000° C. Here, a degree of vacuum within the vacuum chamber is desirably set approximately to 20 to 100 Torr. Thus, graphite in a solid phase and integrally crystalline or polycrystalline can directly be formed on a base material from hydrocarbon in a vapor phase. In addition, graphite extremely small in an amount of an impurity can be fabricated on the base material. It is noted that a methane gas is preferably employed as the hydrocarbon gas.

In fabricating graphite on the base material, the base material set in the vacuum chamber is heated to a temperature not lower than 1500° C. A well known technique can be adopted as a heating method. For example, it is possible that a heater capable of directly or indirectly heating the base material to a temperature not lower than 1500° C. is provided in the vacuum chamber.

Any solid-phase material may be used as the base material for fabricating graphite, so long as it is a material capable of withstanding a temperature approximately from 1500° C. to 3000° C. Specifically, a metal, an inorganic ceramic material, and a carbon material can be used as the base material. From a point of view of suppressing introduction of an impurity in graphite, the base material is preferably composed of carbon. Diamond or graphite can be exemplified as a carbon material in a solid phase. In the case that graphite is used for the base material, graphite extremely small in an amount of an impurity, which is fabricated with the technique described above, can be used for the base material. In the case that such a carbon material as diamond and graphite is employed as a material of the base material, at least a surface of the base material should only be composed of a carbon material. For example, only a surface of the base material may be composed of a carbon material and a remaining portion of the base material may be composed of a material other than the carbon material, or the entire base material may be composed of the carbon material.

Since diamond in the present embodiment is synthesized not through martensitic transformation, a crystal grain size of graphite is not particularly restricted.

For example, hydrogen, oxygen, nitrogen, silicon, and boron can be exemplified as an impurity in graphite. A concentration of these impurities is theoretically approximately the same as a concentration of the impurity above contained in resultant polycrystalline diamond.

In the step of converting graphite to diamond, graphite is preferably subjected to heat treatment at a high pressure without adding a sintering aid or a catalyst. As conditions for synthesizing diamond, a temperature should only be set approximately to 1200° C. to 2500° C. and a pressure should only be set approximately to 7 GPa to 25 GPa. Preferably, a synthesis temperature is not lower than 1900° C. and a synthesis pressure is not lower than 12 GPa.

A uniaxial pressure may be applied or an isotropic pressure may applied, for synthesis of diamond. From a point of view of achieving the same size of crystal grains and the same degree of anisotropy of crystals by application of an isotropic pressure, however, synthesis at a hydrostatic pressure is preferred.

Examples of the present invention will now be described.

Example 1

A methane gas at purity of 99.999% was blown onto a diamond substrate heated to 1900° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Comparative Example 1

Graphite made of coke or pitch was subjected to high-temperature halogen treatment three times so as to have higher purity, and this graphite was employed as a source material. An ultra-high-pressure machine was used to directly obtain polycrystalline diamond from the graphite above at a temperature of 2200° C. and a pressure of 15 GPa. This polycrystalline diamond had a crystal grain size from 50 to 300 nm. As a result of SIMS analysis, H, N, B, O, and Si were detected and a degree thereof was 10 to 1000 times as high as in Example 1. Si not lower than $5 \times 10^{16}$/cm$^3$ was also detected. This polycrystalline diamond had Knoop hardness of 120 GPa.

Comparative Example 2

With the method shown in Japanese Patent Laying-Open No. 2009-67609, a non-diamond carbon substance was employed as a starting material, and polycrystalline diamond was directly obtained at a temperature of 2200° C. and a pressure of 15 GPa. This polycrystalline diamond had a crystal grain size from 50 to 300 nm. Hydrogen and oxygen were not higher than 200 ppm and 50 ppm, respectively, and Knoop hardness was 120 GPa. As a result of SIMS analysis, N, B, and Si were detected and a degree thereof was 10 to 1000 times as high as in Example 1. Thus, it is considered that removal of N, B, and Si greatly affects hardness.

Example 2

A methane gas at purity of 99.999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 3

A methane gas at purity of 99.999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 4

A methane gas at purity of 99.999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 5

A methane gas at purity of 99.999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 6

A methane gas at purity of 99.999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 7

A methane gas at purity of 99.999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 8

A methane gas at purity of 99.999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 9

A methane gas at purity of 99.999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 10

A methane gas at purity of 99.999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 11

A methane gas at purity of 99.999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 12

A methane gas at purity of 99.999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 13

A methane gas at purity of 99.999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 14

A methane gas at purity of 99.999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 170 GPa.

Example 15

A methane gas at purity of 99.9999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 205 GPa.

Example 16

A methane gas at purity of 99.9999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 200 GPa.

Example 17

A methane gas at purity of 99.9999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 200 GPa.

Example 18

A methane gas at purity of 99.9999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 205 GPa.

Example 19

A methane gas at purity of 99.9999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 205 GPa.

Example 20

A methane gas at purity of 99.9999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 21

A methane gas at purity of 99.9999% was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 198 GPa.

Example 22

A methane gas at purity of 99.9999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 23

A methane gas at purity of 99.9999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 24

A methane gas at purity of 99.9999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 25

A methane gas at purity of 99.9999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 26

A methane gas at purity of 99.9999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 27

A methane gas at purity of 99.9999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 28

A methane gas at purity of 99.9999% was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 29

A methane gas at purity of 99.999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 30

A methane gas at purity of 99.999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 31

A methane gas at purity of 99.999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 32

A methane gas at purity of 99.999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 33

A methane gas at purity of 99.999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 34

A methane gas at purity of 99.999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 35

A methane gas at purity of 99.999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 36

A methane gas at purity of 99.999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 37

A methane gas at purity of 99.999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 38

A methane gas at purity of 99.999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 39

A methane gas at purity of 99.999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 40

A methane gas at purity of 99.999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 41

A methane gas at purity of 99.999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 150 GPa.

Example 42

A methane gas at purity of 99.999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 170 GPa.

Example 43

A methane gas at purity of 99.9999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 205 GPa.

Example 44

A methane gas at purity of 99.9999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 200 GPa.

Example 45

A methane gas at purity of 99.9999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 200 GPa.

Example 46

A methane gas at purity of 99.9999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 205 GPa.

Example 47

A methane gas at purity of 99.9999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 205 GPa.

Example 48

A methane gas at purity of 99.9999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 190 GPa.

Example 49

A methane gas at purity of 99.9999% was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 198 GPa.

Example 50

A methane gas at purity of 99.9999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 51

A methane gas at purity of 99.999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 52

A methane gas at purity of 99.9999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 53

A methane gas at purity of 99.9999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 54

A methane gas at purity of 99.9999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 55

A methane gas at purity of 99.9999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

Example 56

A methane gas at purity of 99.9999% was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis of the polycrystalline diamond above, a content of H, N, B, O, and Si was not higher than the detection limit. In addition, in X-ray diffraction patterns of the polycrystalline diamond above, no component other than diamond was observed in polycrystalline diamond. This nano polycrystalline diamond had Knoop hardness of 160 GPa.

In Examples above, it could be confirmed that, by subjecting graphite which was fabricated by thermal decomposition of a hydrocarbon gas having purity not lower than 99.999% and had a solid phase, bulk density from 1.6 g/cm$^3$ to 2.0 g/cm$^3$, and extremely high purity to heat treatment at a temperature approximately from 2000° C. to 2500° C. and at a pressure approximately from 15 to 16 GPa, nano polycrystalline diamond having high purity and high hardness, of which Knoop hardness was approximately from 150 GPa to 205 GPa, could be fabricated. It is considered, however, that nano polycrystalline diamond having comparable characteristics could be fabricated within the scope described in Scope of Claims for Patent even though conditions are out of the range above.

An embodiment of another type of the present invention will be described hereinafter with reference to FIG. 4.

Nano polycrystalline diamond in the present embodiment is composed substantially of a carbon isotope $^{12}$C and has an extremely small amount of an impurity. Though nano polycrystalline diamond typically contains a plurality of inevitable impurities, in nano polycrystalline diamond in the present embodiment, a concentration of each impurity is not higher than 0.01 mass %.

Figure 4:
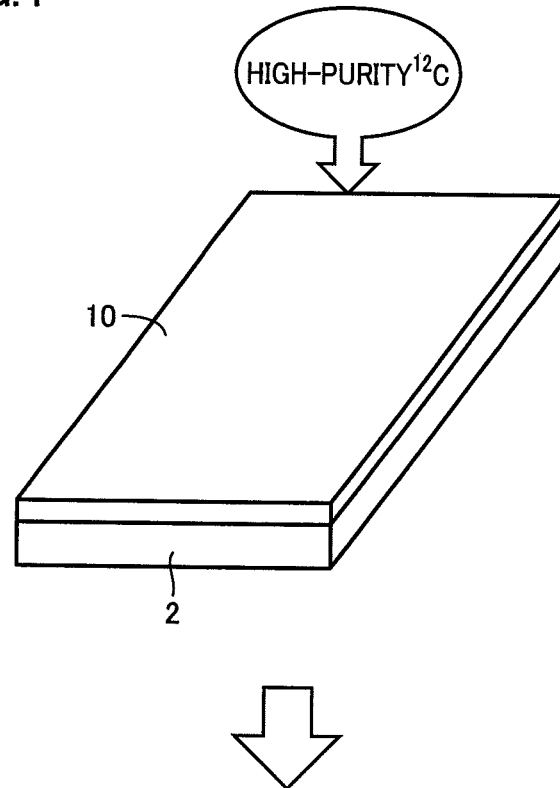
FIG. 4 is a perspective view showing how nano polycrystalline diamond in another embodiment of the present invention is fabricated from graphite formed on a base material.
Figure 4:
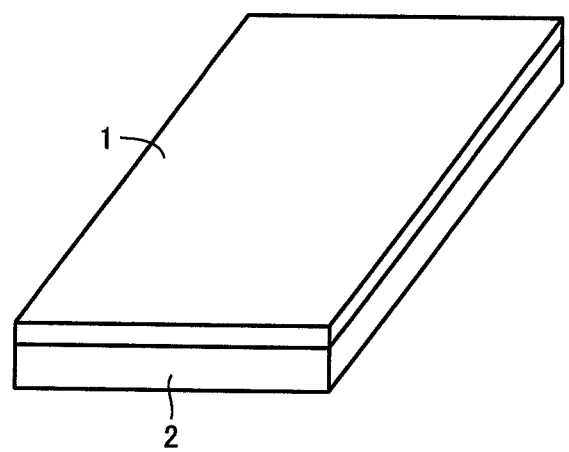

As shown in FIG. 4, nano polycrystalline diamond 1 in the present embodiment is formed on base material 2. Nano polycrystalline diamond 1 can be fabricated by subjecting graphite 10 composed substantially of a high-purity carbon isotope $^{12}$C and formed on base material 2 to heat treatment.

Nano polycrystalline diamond 1 in the present embodiment is extremely low in impurity concentration in its entirety, segregation of an impurity as in the conventional example is not observed, and an impurity concentration in any portion is also extremely low. Therefore, a concentration of the impurity at a crystal grain boundary of nano polycrystalline diamond is also approximately not higher than 0.01 mass %.

Thus, in nano polycrystalline diamond 1 in the present embodiment, since a concentration of each impurity in diamond is extremely low, that is, not higher than 0.01 mass %, adverse influence by an impurity on intensity of fluorescence of an NV center in the inside of diamond or on a width of a resonance line which determines sensitivity can effectively be suppressed. Consequently, with the nano polycrystalline diamond in the present embodiment, magnetic sensing making use of the NV center can be carried out.

In addition, by condensing carbon isotope $^{12}$C to thereby achieve high purity not lower than 99.9 mass % (in the case that a carbon isotope $^{13}$C is contained, a concentration of carbon isotope $^{13}$C is not higher than 0.1 mass %), an unnecessary nuclear spin or electron spin can also effectively be suppressed. Furthermore, in a diamond crystal composed of carbon isotope $^{12}$C and carbon isotope $^{13}$C as mixed, a concentration of carbon isotope $^{13}$C is set to 0.1 mass % or lower, so that influence by a nuclear spin can more effectively be lessened.

It is noted that a distance between adjacent spins is desirably not smaller than approximately several ten nm. In addition, an electron spin having spin magnetic moment 1000 times as high as that of a nuclear spin is desirably not higher than 1/1000, that is, not higher than 0.001%.

In magnetometry, fluorescence of an NV center and variation in fluorescence caused by magnetic response should only be made use of. For example, magnetometry can be carried out by making use of the fact that light emission of 638 nm or 1042 nm generated as a result of absorption of light having a wavelength from 400 to 500 nm in diamond exhibits variation in intensity in response to external magnetic field under a specific microwave emission condition.

In the case that nano polycrystalline diamond in the present embodiment contains, for example, hydrogen, oxygen, nitrogen, silicon, and boron as an impurity, in the nano polycrystalline diamond, a concentration of hydrogen is approximately not higher than $2\times10^{18}/cm^3$, a concentration of oxygen is approximately not higher than $2\times10^{17}/cm^3$, a concentration of nitrogen is approximately not higher than $4\times10^{16}/cm^3$, a concentration of silicon is approximately not higher than $1\times10^{16}/cm^3$, and a concentration of boron is approximately not higher than $2\times10^{15}/cm^3$. Preferably, in the nano polycrystalline diamond, a concentration of hydrogen is approximately not higher than $5\times10^{17}/cm^3$, a concentration of oxygen is approximately not higher than $1\times10^{17}/cm^3$, a concentration of nitrogen is approximately not higher than $1\times10^{16}/cm^3$, a concentration of silicon is approximately not higher than $5\times10^{15}/cm^3$, and a concentration of boron is approximately not higher than $7\times10^{14}/cm^3$.

In nano polycrystalline diamond in the present embodiment, since a concentration of an impurity at the crystal grain boundary is also extremely low as described above, slip of crystal grains at the crystal grain boundary can be suppressed. Consequently, bond between crystal grains can be strengthened, as compared with polycrystalline diamond fabricated with the conventional CVD method.

In addition, since nano polycrystalline diamond in the present embodiment has less anisotropy than other diamonds such as single-crystal diamond, it can be used in various shapes. For example, it can be in a needle-like shape such that it can directly be inserted in a subject. In this case, a hard substance can also be tested. Moreover, nano polycrystalline diamond in the present embodiment can be in a thin plate shape and a test in which a sample is placed thereon can also be conducted. In this case as well, since cleavage is less likely, nano polycrystalline diamond is less likely to crack and magnetic response of a substance or a cell can be observed while a pressure is applied thereto.

Furthermore, as purity of a carbon isotope is made higher, not only slip of a crystal at a crystal grain boundary of nano polycrystalline diamond is further less likely, but also non-uniformity of a carbon isotope due to condensation of the carbon isotope can also be eliminated. Therefore, all crystal grains in nano polycrystalline diamond are bonded like one crystal, and molecules can be bonded to one another in a state close to single crystal even at a crystal grain boundary, as compared to a crystal grain boundary of a common diamond polycrystal. As a result of such a synergistic effect, nano polycrystalline diamond in the present embodiment can have Knoop hardness as high as approximately 150 GPa or higher. In addition, as a result of such an effect that thermal conductivity was higher and non-uniformity of an isotope was less than those of carbon only having high purity, such an additional effect that wear due to friction was less and wear resistance in an atmosphere in a range from room temperature to 800° C. was about three times as high as that of a condensed isotope was also obtained.

In addition to the above, abnormal growth of crystal grains during synthesis of diamond can also effectively be suppressed and variation in size of crystal grains can also be lessened. Specifically, nano polycrystalline diamond in the present embodiment has a crystal grain size (a maximum length) not greater than 500 nm. More specifically, nano polycrystalline diamond has a crystal grain size (a maximum length) approximately from 10 to 100 nm.

Graphite which can be used in fabrication of nano polycrystalline diamond in the present embodiment will now be described.

Graphite is integral solid carbon and contains a crystallized portion. In an example in FIG. 4, though polycrystalline diamond 1 and graphite 10 have a shape like a flat plate, it is possible that they have any shape and thickness. In addition, a component such as a concentration of an impurity in graphite 10 is also basically taken over by nano polycrystalline diamond 1.

A crystal grain size (a maximum length of a crystal grain) in the crystallized portion of graphite is not particularly limited. Regardless of whether graphite is polycrystalline or monocrystalline, a concentration of an impurity and condensation of an isotope in the present embodiment are essential, and polycrystalline diamond can have nano-sized crystal grains as graphite undergoes non-martensitic transformation. Here, a small amount of an impurity brings about a favorable effect for preventing excessive growth of crystal grains and a particle size not greater than 100 nm can readily be obtained.

Bulk density of graphite is desirably, for example, not lower than 0.8 g/cm$^3$. Preferably, bulk density of graphite is not lower than 1.4 g/cm$^3$. By setting density as such, volume change due to compression during a high-temperature and high-pressure process can be suppressed to be small, and not only temperature control is facilitated but also yield can be improved.

An impurity introduced in graphite is exemplified by nitrogen, hydrogen, oxygen, boron, silicon, such a transition metal as promoting growth of crystal grains, and the like. Nitrogen is great in an amount of precipitation at a crystal grain boundary as described previously and a concentration at the crystal grain boundary is also normally several hundred ppm in a conventional example. Thus, crystal grains tend to slip at the crystal grain boundary. Hydrogen is stabilized by sp2 bond at the crystal grain boundary, which consequently lowers hardness of graphite. Since a source material for graphite is coke or pitch as described previously in a diamond sintered object fabricated with conventional graphite, hydrogen in an amount of approximately several hundred ppm is inevitably introduced in graphite in spite of treatment for highly purifying the same. Oxygen is likely to react with carbon, and in addition, it forms an oxide with boron and promotes local growth of crystal grains. In addition, nitrogen and boron cause slip of crystal grains at the crystal grain boundary, which interferes with increase in hardness up to essential hardness limit.

In graphite used for fabricating nano polycrystalline diamond in the present embodiment, an amount of an impurity such as nitrogen, hydrogen, oxygen, boron, silicon, and a transition metal is 0.01 mass % or lower. Namely, a concentration of an impurity in graphite is approximately not higher than a detection limit in SIMS (Secondary Ion Mass Spectrometry) analysis. In addition, a concentration of a transition metal in graphite is approximately not higher than a detection limit in ICP (Inductively Coupled Plasma) analysis or SIMS analysis.

Thus, in the case that an amount of an impurity in graphite is lowered down to a level of the detection limit in SIMS analysis or ICP analysis and diamond is made of graphite, diamond having extremely high purity and high hardness can be fabricated. It is noted that, even when graphite containing an impurity slightly more than the detection limit in SIMS analysis or ICP analysis is employed, diamond having characteristics significantly better than in a conventional example is obtained.

A method for manufacturing nano polycrystalline diamond in the present embodiment will now be described.

Nano polycrystalline diamond according to the present embodiment can be fabricated by subjecting graphite obtained by thermal decomposition of a hydrocarbon gas of which purity of carbon isotope $^{12}$C is not lower than 99.9 mass % (in the case that a carbon isotope $^{13}$C is contained, a concentration of carbon isotope $^{13}$C is not higher than 0.1 mass %) and of which chemical purity is not lower than 99 mass % to heat treatment in high-temperature and high-pressure press equipment to thereby convert graphite to diamond. Namely, nano polycrystalline diamond according to the present embodiment can be fabricated by subjecting carbon in a solid phase composed substantially of a high-purity carbon isotope $^{12}$C and having an extremely low impurity concentration to heat treatment in a vacuum atmosphere.

Graphite above may be fabricated within the vacuum chamber before fabrication of nano polycrystalline diamond, or graphite formed in advance on a base material or the like may separately be prepared and stored.

Graphite can be formed on the base material by thermal decomposition of a hydrocarbon gas introduced in the vacuum chamber, of which purity of carbon isotope $^{12}$C is not lower than 99.9 mass % and of which chemical purity is not lower than 99 mass %, at a temperature approximately not lower than 1500° C. and not higher than 3000° C. Here, a degree of vacuum within the vacuum chamber is desirably set approximately to 20 to 100 Torr. Thus, graphite in a solid phase and integrally crystalline or polycrystalline can directly be formed on a base material from hydrocarbon in a vapor phase. In addition, graphite extremely small in an amount of an impurity can be fabricated on the base material. It is noted that a methane gas is preferably employed as the hydrocarbon gas.

In fabricating graphite on the base material, the base material set in the vacuum chamber is heated to a temperature not lower than 1500° C. A well known technique can be adopted as a heating method. For example, it is possible that a heater capable of directly or indirectly heating the base material to a temperature not lower than 1500° C. is provided in the vacuum chamber.

Any solid-phase material may be used as the base material for fabricating graphite, so long as it is a material capable of withstanding a temperature approximately from 1500° C. to 3000° C. Specifically, a metal, an inorganic ceramic material, and a carbon material can be used as the base material. From a point of view of suppressing introduction of an impurity in graphite, the base material is preferably made of carbon. Diamond or graphite can be exemplified as a carbon material in a solid phase. In the case that graphite is used for the base material, graphite extremely small in an amount of an impurity, which is fabricated with the technique described above, can be used for the base material. In the case that such a carbon material as diamond and graphite is employed as a material of the base material, at least a surface of the base material should only be composed of a carbon material. For example, only a surface of the base material may be composed of a carbon material and a remaining portion of the base material may be composed of a material other than the carbon material, or the entire base material may be composed of the carbon material.

In the step of converting graphite to diamond, graphite is preferably subjected to heat treatment in high-temperature and high-pressure press equipment without adding a sintering aid or a catalyst. As conditions for synthesizing diamond, a temperature should only be set approximately to 1200° C. to 2500° C. and a pressure should only be set approximately to 7 GPa to 25 GPa. Preferably, a synthesis temperature is not lower than 1900° C. and a synthesis pressure is not lower than 12 GPa.

A uniaxial pressure may be applied or an isotropic pressure may applied, for synthesis of diamond. From a point of view of achieving the same size of crystal grains and the same degree of anisotropy of crystals by application of an isotropic pressure, however, synthesis at a hydrostatic pressure is preferred.

Examples of another type of the present invention will now be described.

Example 57

A methane gas of which purity of carbon isotope $^{12}$C was 99.9 mass % and of which chemical purity was 99 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 1% at the maximum, depending on presence/absence of magnetic field, was observed. This polycrystalline diamond had Knoop hardness of 190 GPa.

Example 58

A methane gas of which purity of carbon isotope $^{12}$C was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 59

A methane gas of which purity of carbon isotope $^{12}$C was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 60

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 61

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 62

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 63

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 64

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 65

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 66

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 67

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 68

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 69

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 70

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 170 GPa.

Example 71

A methane gas of which purity of carbon isotope $^{12}C$ was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/ absence of magnetic field, was observed. This polycrystalline diamond had Knoop hardness of 205 GPa.

Example 72

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 200 GPa.

Example 73

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 200 GPa.

Example 74

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 205 GPa.

Example 75

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 205 GPa.

Example 76

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 77

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 198 GPa.

Example 78

A methane gas of which purity of carbon isotope $^{12}$C was 99.999 mass % and of which chemical purity was 99.999 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 160 GPa.

Example 79

A methane gas of which purity of carbon isotope $^{12}$C was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 160 GPa.

Example 80

A methane gas of which purity of carbon isotope $^{12}$C was 99.999 mass % and of which chemical purity was 99.999 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 160 GPa.

Example 81

A methane gas of which purity of carbon isotope $^{12}C$ was 99.999 mass % and of which chemical purity was 99.999 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 160 GPa.

Example 82

A methane gas of which purity of carbon isotope $^{12}C$ was 99.999 mass % and of which chemical purity was 99.999 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 160 GPa.

Example 83

A methane gas of which purity of carbon isotope $^{12}C$ was 99.999 mass % and of which chemical purity was 99.999 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 160 GPa.

Example 84

A methane gas of which purity of carbon isotope $^{12}C$ was 99.999 mass % and of which chemical purity was 99.999 mass % was blown onto a diamond substrate heated to 1500° C. through porous titanium heated to 600° C. in a vacuum chamber. Here, a degree of vacuum in the vacuum chamber was set to 20 to 30 Torr. Then, graphite deposited on the diamond substrate. Bulk density of graphite was 1.6 g/cm³.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 160 GPa.

Example 85

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 86

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 87

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 88

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 89

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm³.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 90

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm³.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 91

A methane gas of which purity of carbon isotope $^{12}C$ was 99.999 mass % and of which chemical purity was 99 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm³.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 190 GPa.

Example 92

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm³.

Graphite above was directly converted to polycrystalline diamond under conditions of 2200° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 93

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 94

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 95

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 96

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/ absence of magnetic field, was observed. This polycrystalline diamond had Knoop hardness of 150 GPa.

Example 97

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 150 GPa.

Example 98

A methane gas of which purity of carbon isotope $^{12}C$ was 99.999 mass % and of which chemical purity was 99 mass % was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 170 GPa.

Example 99

A methane gas of which purity of carbon isotope $^{12}C$ was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 4% at the maximum, depending on presence/absence of magnetic field, was observed. This polycrystalline diamond had Knoop hardness of 200 GPa.

Example 100

A methane gas of which purity of carbon isotope $^{12}C$ was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 4% at the maximum, depending on presence/absence of magnetic field, was observed. This polycrystalline diamond had Knoop hardness of 200 GPa.

Example 101

A methane gas of which purity of carbon isotope $^{12}C$ was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2400° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 4% at the maximum, depending on presence/absence of magnetic field, was observed. This polycrystalline diamond had Knoop hardness of 200 GPa.

Example 102

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2500° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 4% at the maximum, depending on presence/absence of magnetic field, was observed. This polycrystalline diamond had Knoop hardness of 200 GPa.

Example 103

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2000° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 210 GPa.

Example 104

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2100° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately 10$^{10}$/cm$^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 4% at the maximum, depending on presence/absence of magnetic field, was observed. This polycrystalline diamond had Knoop hardness of 190 GPa.

Example 105

A methane gas of which purity of carbon isotope $^{12}$C was 99.999 mass % and of which chemical purity was 99.999 mass % was blown onto a diamond substrate heated to 1900° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 16 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 3% at the maximum, depending on presence/absence of magnetic field, was observed. This polycrystalline diamond had Knoop hardness of 198 GPa.

Example 106

A methane gas of which purity of carbon isotope $^{12}C$ was 99.999 mass % and of which chemical purity was 99.999 mass % was blown onto a diamond substrate heated to 1500° C. through porous titanium heated to 600° C. in a vacuum chamber. Here, a degree of vacuum in the vacuum chamber was set to 90 to 100 Torr. Then, graphite deposited on the diamond substrate. Bulk density of graphite was 1.6 g/cm³.

Graphite above was directly converted to polycrystalline diamond under conditions of a temperature of 2300° C. and a pressure of 15 GPa. This polycrystalline diamond had a crystal grain size approximately from 10 to 100 nm. As a result of SIMS analysis, a content of nitrogen, hydrogen, oxygen, boron, and silicon in the polycrystalline diamond was not higher than the detection limit. In addition, in X-ray diffraction patterns of the polycrystalline diamond above, no component other than diamond was observed in polycrystalline diamond.

This nano polycrystalline diamond was subjected to heat treatment at 900° C. by being irradiated with nitrogen of approximately $10^{10}/cm^2$ at acceleration energy of 300 keV. Thereafter, intensity of fluorescence at 637 nm from an NV-center produced in that process was measured. Consequently, when laser of 532 nm was emitted as excitation light under irradiation with microwaves having a frequency of 2.87 GHz, 5 turns, and output of 0.5 W from an annular coil having a diameter of 0.5 cm, variation in intensity of fluorescence of 4% at the maximum, depending on presence/absence of magnetic field, was observed. This polycrystalline diamond had Knoop hardness of 180 GPa.

In Examples above, it could be confirmed that, by subjecting graphite which was fabricated by thermal decomposition of a hydrocarbon gas of which purity of carbon isotope $^{12}C$ was not lower than 99.9 mass % and of which chemical purity was not lower than 99 mass % and had a solid phase, bulk density approximately from 1.6 g/cm³ to 2.0 g/cm³, and extremely high purity to heat treatment at a temperature approximately from 2000° C. to 2500° C. and at a pressure approximately from 15 to 16 GPa, nano polycrystalline diamond which could be made use of for magnetic sensing and had Knoop hardness approximately from 150 GPa to 205 GPa and high purity could be fabricated. It is considered, however, that nano polycrystalline diamond having comparable characteristics could be fabricated within the scope described in Scope of Claims for Patent of the present application even though conditions are out of the range above.

An embodiment of yet another type of the present invention will be described hereinafter with reference to FIG. 5.

Nano polycrystalline diamond in the present embodiment is composed substantially of any carbon isotope of $^{12}C$ and $^{13}C$ and has an extremely small amount of an impurity. Though nano polycrystalline diamond typically contains a plurality of inevitable impurities, in nano polycrystalline diamond in the present embodiment, a concentration of each impurity is not higher than 0.01 mass %.

Figure 5:
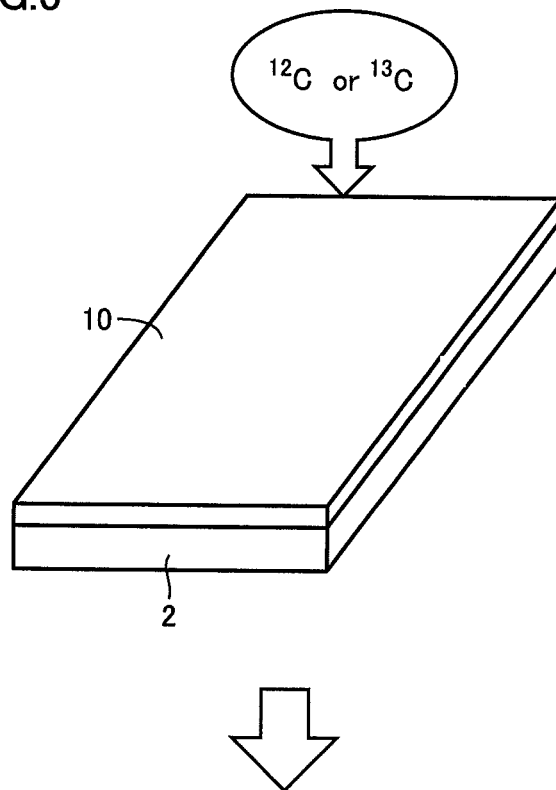
FIG. 5 is a perspective view showing how nano polycrystalline diamond in yet another embodiment of the present invention is fabricated from graphite formed on a base material.
Figure 5:
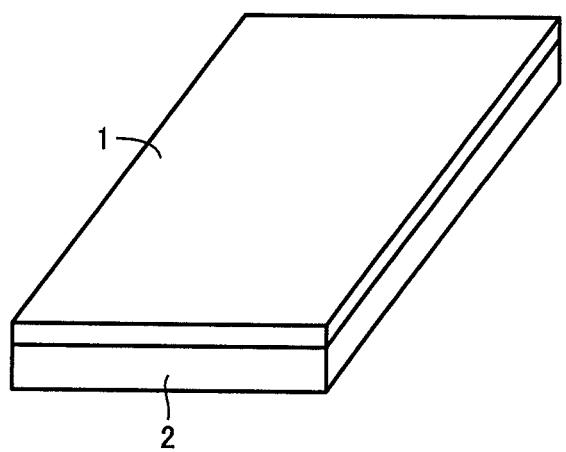

As shown in FIG. 5, nano polycrystalline diamond 1 in the present embodiment is formed on base material 2. Nano polycrystalline diamond 1 can be fabricated by subjecting graphite 10 composed substantially of any carbon isotope of $^{12}C$ and $^{13}C$ and formed on base material 2 to heat treatment.

Since nano polycrystalline diamond 1 in the present embodiment is composed substantially of any carbon isotope of $^{12}C$ and $^{13}C$, scattering of phonons can effectively be suppressed and thermal conductivity can be improved.

Graphite 10 is integral solid carbon and contains a crystallized portion. In an example in FIG. 5, though polycrystalline diamond 1 and graphite 10 have a shape like a flat plate, it is possible that they have any shape and thickness. In the case that graphite 10 formed on base material 2 is subjected to heat treatment to fabricate nano polycrystalline diamond 1, nano polycrystalline diamond 1 and graphite 10 basically have the same shape.

Bulk density of graphite is desirably, for example, not lower than 0.8 g/cm³. Preferably, bulk density of graphite is not lower than 1.4 g/cm³. By setting density as such, volume change due to compression during a high-temperature and high-pressure process can be suppressed to be small, and not only temperature control is facilitated but also yield can be improved.

An impurity introduced in graphite is exemplified by nitrogen, hydrogen, oxygen, boron, silicon, such a transition metal as promoting growth of crystal grains, and the like. Nitrogen is great in an amount of precipitation at a crystal grain boundary and a concentration at the crystal grain boundary is also normally several hundred ppm in a conventional example. Thus, crystal grains tend to slip at the crystal grain boundary. Hydrogen is stabilized by sp2 bond at the crystal grain boundary, which consequently lowers hardness of graphite. Since a source material for graphite is coke or pitch as described above in a diamond sintered object fabricated with conventional graphite, hydrogen in an amount of approximately several hundred ppm is inevitably introduced in graphite in spite of treatment for highly purifying the same. Oxygen is likely to react with carbon, and in addition, it forms an oxide with boron and promotes local growth of crystal grains. In addition, nitrogen and boron cause slip of crystal grains at the crystal grain boundary, which interferes with increase in hardness up to essential hardness limit.

In graphite used for fabricating nano polycrystalline diamond in the present embodiment, an amount of an impurity such as nitrogen, hydrogen, oxygen, boron, silicon, and a transition metal is 0.01 mass % or lower. Namely, a concentration of an impurity in graphite is approximately not higher than a detection limit in SIMS (Secondary Ion Mass Spectrometry) analysis. In addition, a concentration of a transition metal in graphite is approximately not higher than a detection limit in ICP (Inductively Coupled Plasma) analysis or SIMS analysis.

Thus, in the case that an amount of an impurity in graphite is lowered down to a level of the detection limit in SIMS analysis or ICP analysis and diamond is made of this graphite, diamond having extremely high purity and high hardness can be fabricated. It is noted that, even when graphite containing an impurity slightly more than the detection limit in SIMS analysis or ICP analysis is employed, diamond having characteristics significantly better than in a conventional example is obtained.

In nano polycrystalline diamond in the present embodiment, a concentration of an impurity is extremely low in its entirety, segregation of an impurity as in the conventional example is not observed, and a concentration of an impurity in any portion is also extremely low. Therefore, a concentration of an impurity at a crystal grain boundary of nano polycrystalline diamond is also approximately not higher than 0.01 mass %. Since a concentration of an impurity at the crystal grain boundary of diamond is thus extremely low, scattering of phonons at the crystal grain boundary can effectively be suppressed. Moreover, since a concentration of an impurity at the crystal grain boundary of diamond is extremely low, crystal grains of diamond are bonded in a state close to single crystal, and a speed of movement forward of phonons can be close to that in single-crystal diamond, as compared with conventional polycrystalline diamond.

In the case that nano polycrystalline diamond in the present embodiment contains, for example, hydrogen, oxygen, nitrogen, silicon, and boron as an impurity, in the nano polycrystalline diamond, a concentration of hydrogen is approximately not higher than $2 \times 10^{18}/cm^3$, a concentration of oxygen is approximately not higher than $2 \times 10^{17}/cm^3$, a concentration of nitrogen is approximately not higher than $4 \times 10^{16}/cm^3$, a concentration of silicon is approximately not higher than $1 \times 10^{16}/cm^3$, and a concentration of boron is approximately not higher than $2 \times 10^{15}/cm^3$. Preferably, in the nano polycrystalline diamond, a concentration of hydrogen is approximately not higher than $5 \times 10^{17}/cm^3$, a concentration of oxygen is approximately not higher than $1 \times 10^{17}/cm^3$, a concentration of nitrogen is approximately not higher than $1 \times 10^{16}/cm^3$, a concentration of silicon is approximately not higher than $5 \times 10^{15}/cm^3$, and a concentration of boron is approximately not higher than $7 \times 10^{14}/cm^3$.

In nano polycrystalline diamond in the present embodiment, since a concentration of an impurity at the crystal grain boundary is extremely low, slip of crystal grains at the crystal grain boundary can also be suppressed. Consequently, bond between crystal grains can also be strengthened, as compared with polycrystalline diamond fabricated with the conventional CVD method, which can also contribute to good movement forward of phonons. Moreover, polycrystalline diamond can also have Knoop hardness as high as approximately 140 GPa or higher.

Furthermore, abnormal growth of crystal grains during synthesis of diamond can also effectively be suppressed and variation in size of crystal grains can also be lessened. Specifically, a crystal grain size (a maximum length) of nano polycrystalline diamond in the present embodiment is not greater than 500 nm. More specifically, a crystal grain size (a maximum length) of nano polycrystalline diamond is approximately from 10 to 100 nm.

A method for manufacturing nano polycrystalline diamond in the present embodiment will now be described.

Nano polycrystalline diamond according to the present embodiment can be fabricated by subjecting graphite obtained by thermal decomposition of a hydrocarbon gas of which purity of carbon isotope $^{12}C$ or $^{13}C$ is not lower than 99.9 mass % to heat treatment in high-pressure press equipment to thereby convert graphite to diamond. Namely, nano polycrystalline diamond according to the present embodiment can be fabricated by subjecting carbon in a solid phase composed substantially of any carbon isotope of $^{12}C$ and $^{13}C$ and having an extremely low impurity concentration to heat treatment in a vacuum atmosphere.

Graphite above may be fabricated within the vacuum chamber before fabrication of nano polycrystalline diamond, or graphite formed in advance on a base material or the like may separately be prepared and stored.

Graphite can be formed on the base material by thermal decomposition of a hydrocarbon gas introduced in the vacuum chamber, of which purity of carbon isotope $^{12}C$ or $^{13}C$ is not lower than 99.9 mass %, at a temperature approximately not lower than 1500° C. and not higher than 3000° C. Here, a degree of vacuum within the vacuum chamber is desirably set approximately to 20 to 150 Torr. Thus, graphite in a solid phase and integrally crystalline or polycrystalline can directly be formed on a base material from hydrocarbon in a vapor phase. In addition, graphite extremely small in an amount of an impurity can be fabricated on the base material. It is noted that a methane gas is preferably employed as the hydrocarbon gas.

In fabricating graphite on the base material, the base material set in the vacuum chamber is heated to a temperature not lower than 1500° C. A well known technique can be adopted as a heating method. For example, it is possible that a heater capable of directly or indirectly heating the base material to a temperature not lower than 1500° C. is provided in the vacuum chamber.

Any solid-phase material may be used as the base material for fabricating graphite, so long as it is a material capable of withstanding a temperature approximately from 1500° C. to 3000° C. Specifically, a metal, an inorganic ceramic material, and a carbon material can be used as the base material. From a point of view of suppressing introduction of an impurity in graphite, the base material is preferably made of carbon. Diamond or graphite can be exemplified as a carbon material in a solid phase. In the case that graphite is used for the base material, graphite extremely small in an amount of an impurity, which is fabricated with the technique described above, can be used for the base material. In the case that such a carbon material as diamond and graphite is employed as a material of the base material, at least a surface of the base material should only be composed of a carbon material. For example, only a surface of the base material may be composed of a carbon material and a remaining portion of the base material may be composed of a material other than the carbon material, or the entire base material may be composed of the carbon material.

In the step of converting graphite to diamond, graphite is preferably subjected to heat treatment in high-pressure press equipment without adding a sintering aid or a catalyst. As conditions for synthesizing diamond, a temperature should only be set approximately to 1200° C. to 2500° C. and a pressure should only be set approximately to 7 GPa to 25 GPa. Preferably, a synthesis temperature is not lower than 1900° C. and a synthesis pressure is not lower than 12 GPa.

A uniaxial pressure may be applied or an isotropic pressure may applied, for synthesis of diamond. From a point of view of achieving the same size of crystal grains and the same degree of anisotropy of crystals by application of an isotropic pressure, however, synthesis at a hydrostatic pressure is preferred.

Examples of yet another type of the present invention will now be described.

Example 107

A methane gas in which $^{12}C$ was increased to 99.999% was blown onto a diamond substrate heated to 1900° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond.

Thermal conductivity of this nano polycrystalline diamond was examined through measurement of thermal diffusivity, and then it was 1.17 times (265 W/mK) as high as that of natural carbon having an equivalent particle size. In addition, Knoop hardness thereof was 130 GPa.

Example 108

A methane gas in which $^{13}C$ was increased to 99.999% was blown onto a diamond substrate heated to 1900° C. in a vacuum chamber. Here, a degree of vacuum in the vacuum chamber was set to 20 to 30 Torr. Then, graphite deposited on the diamond substrate. Bulk density of graphite was 2.0 g/cm$^3$.

Graphite above was directly converted to polycrystalline diamond under conditions of a temperature of 2200° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond.

Thermal conductivity of this nano polycrystalline diamond was approximately 1.2 times (271 W/mK) as high as that of natural carbon having an equivalent particle size. In addition, Knoop hardness thereof was 140 GPa.

Example 109

A methane gas of which purity of $^{12}C$ was 99.9% was blown onto a Ta substrate heated to 1900° C. in a vacuum chamber. Here, a degree of vacuum in the vacuum chamber was set to 20 to 30 Torr. Then, graphite deposited on the substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 200 W/mK. In addition, Knoop hardness thereof was 150 GPa.

Example 110

A methane gas of which purity of $^{12}C$ was 99.999% was blown onto a Ta substrate heated to 1900° C. in a vacuum chamber. Here, a degree of vacuum in the vacuum chamber was set to 20 to 30 Torr. Then, graphite deposited on the substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 200 W/mK. In addition, Knoop hardness thereof was 190 GPa.

Example 111

A methane gas of which purity of $^{12}C$ was 99.9% was blown onto a Ta substrate heated to 1600° C. in a vacuum chamber. Here, a degree of vacuum in the vacuum chamber was set to 20 to 30 Torr. Then, graphite deposited on the substrate. Bulk density of graphite was 1.4 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 200 W/mK. In addition, Knoop hardness thereof was 150 GPa.

Example 112

A methane gas of which purity of $^{12}C$ was 99.999% was blown onto a Ta substrate heated to 1600° C. in a vacuum chamber. Here, a degree of vacuum in the vacuum chamber was set to 20 to 30 Torr. Then, graphite deposited on the substrate. Bulk density of graphite was 1.4 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 250 W/mK. In addition, Knoop hardness thereof was 190 GPa.

Example 113

A methane gas of which purity of $^{12}C$ was 99.9% was blown onto a Ta substrate heated to 1700° C. in a vacuum chamber. Here, a degree of vacuum in the vacuum chamber was set to 100 to 150 Torr. Then, graphite deposited on the substrate. Bulk density of graphite was 1.8 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 200 W/mK. In addition, Knoop hardness thereof was 160 GPa.

Example 114

A methane gas of which purity of $^{12}C$ was 99.999% was blown onto a Ta substrate heated to 1700° C. in a vacuum chamber. Here, a degree of vacuum in the vacuum chamber was set to 100 to 150 Torr. Then, graphite deposited on the substrate. Bulk density of graphite was 1.8 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 220 W/mK. In addition, Knoop hardness thereof was 185 GPa.

Example 115

A methane gas of which purity of $^{13}$C was 99.9% was blown onto a Ta substrate heated to 1900° C. in a vacuum chamber. Here, a degree of vacuum in the vacuum chamber was set to 20 to 30 Torr. Then, graphite deposited on the substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 250 W/mK. In addition, Knoop hardness thereof was 150 GPa.

Example 116

A methane gas of which purity of $^{13}$C was 99.999% was blown onto a Ta substrate heated to 1900° C. in a vacuum chamber. Here, a degree of vacuum in the vacuum chamber was set to 20 to 30 Torr. Then, graphite deposited on the substrate. Bulk density of graphite was 2.0 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 200 W/mK. In addition, Knoop hardness thereof was 190 GPa.

Example 117

A methane gas of which purity of $^{13}$C was 99.9% was blown onto a Ta substrate heated to 1600° C. in a vacuum chamber. Here, a degree of vacuum in the vacuum chamber was set to 20 to 30 Torr. Then, graphite deposited on the substrate. Bulk density of graphite was 1.4 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 300 W/mK. In addition, Knoop hardness thereof was 150 GPa.

Example 118

A methane gas of which purity of $^{13}$C was 99.999% was blown onto a Ta substrate heated to 1600° C. in a vacuum chamber. Here, a degree of vacuum in the vacuum chamber was set to 20 to 30 Torr. Then, graphite deposited on the substrate. Bulk density of graphite was 1.4 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 230 W/mK. In addition, Knoop hardness thereof was 190 GPa.

Example 119

A methane gas of which purity of $^{13}$C was 99.9% was blown onto a Ta substrate heated to 1700° C. in a vacuum chamber. Here, a degree of vacuum in the vacuum chamber was set to 100 to 150 Torr. Then, graphite deposited on the substrate. Bulk density of graphite was 1.8 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 300 W/mK. In addition, Knoop hardness thereof was 160 GPa.

Example 120

A methane gas of which purity of $^{13}$C was 99.999% was blown onto a Ta substrate heated to 1700° C. in a vacuum chamber. Here, a degree of vacuum in the vacuum chamber was set to 100 to 150 Torr. Then, graphite deposited on the substrate. Bulk density of graphite was 1.8 g/cm$^3$.

Graphite above was directly converted to polycrystalline diamond under conditions of a temperature of 2300° C. and a pressure of 15 GPa. This polycrystalline diamond had a crystal grain size approximately from 10 to 100 nm. In X-ray diffraction patterns of the polycrystalline diamond above, no component other than diamond was observed in polycrystalline diamond. Thermal conductivity of this nano polycrystalline diamond was 200 W/mK. In addition, Knoop hardness thereof was 185 GPa.

In Examples above, it could be confirmed that, by subjecting graphite which was fabricated by thermal decomposition of a hydrocarbon gas of which purity of $^{12}$C or $^{13}$C was not lower than 99.9% and had a solid phase, bulk density approximately from 1.4 g/cm$^3$ to 2.0 g/cm$^3$, and extremely high purity to heat treatment at a temperature approximately from 2200° C. to 2300° C. and at a pressure around 15 GPa, nano polycrystalline diamond having Knoop hardness approximately from 130 GPa to 190 GPa, excellent thermal conductivity, and high purity could be fabricated. It is considered, however, that nano polycrystalline diamond having comparable characteristics could be fabricated within the scope described in Scope of Claims for Patent of the present application even though conditions are out of the range above.

Though the embodiments and the examples of the present invention have been described above, the embodiments and the examples described above can also variously be modified. In addition, the scope of the present invention is not limited to the embodiments and the examples described above. The scope of the present invention is defined by the

The invention claimed is:

1. Polycrystalline diamond, comprising:
   carbon; and
   a plurality of impurities,
   the polycrystalline diamond having a concentration of each of said plurality of impurities not higher than 0.01 mass % and a crystal grain size not greater than 500 nm,
   the polycrystalline diamond having Knoop hardness not lower than 150 GPa, and
   the polycrystalline diamond fabricated by sintering graphite obtained by thermal decomposition of hydrocarbon having purity not lower than 99.99%, at a temperature not lower than 1500° C.

2. The polycrystalline diamond according to claim 1, wherein
   a concentration of said impurities at a crystal grain boundary of said polycrystalline diamond is each not higher than 0.01 mass %.

3. The polycrystalline diamond according to claim 1, wherein
   said plurality of impurities include hydrogen, oxygen, nitrogen, silicon, and boron,
   a concentration of said hydrogen is not higher than $2 \times 10^{18}/cm^3$,
   a concentration of said oxygen is not higher than $2 \times 10^{17}/cm^3$,
   a concentration of said nitrogen is not higher than $4 \times 10^{16}/cm^3$,
   a concentration of said silicon is not higher than $1 \times 10^{16}/cm^3$, and
   a concentration of said boron is not higher than $2 \times 10^{15}/cm^3$.

4. Polycrystalline diamond, comprising:
   carbon in which purity of a carbon isotope $^{12}C$ is not lower than 99.9 mass %; and
   a plurality of impurities,
   the polycrystalline diamond having a concentration of each of said plurality of impurities not higher than 0.01 mass % and a crystal grain size not greater than 500 nm,
   the polycrystalline diamond having Knoop hardness not lower than 150 GPa, and
   the polycrystalline diamond fabricated by sintering graphite obtained by thermal decomposition of hydrocarbon in which purity of said carbon isotope $^{12}C$ is not lower than 99.9 mass %, at a temperature not lower than 1500° C.

5. The polycrystalline diamond according to claim 4, wherein
   a concentration of said impurities at a crystal grain boundary of said polycrystalline diamond is each not higher than 0.01 mass %.

6. The polycrystalline diamond according to claim 4, wherein
   said plurality of impurities include hydrogen, oxygen, nitrogen, silicon, and boron,
   a concentration of said hydrogen is not higher than $2 \times 10^{18}/cm^3$,
   a concentration of said oxygen is not higher than $2 \times 10^{17}/cm^3$,
   a concentration of said nitrogen is not higher than $4 \times 10^{16}/cm^3$,
   a concentration of said silicon is not higher than $1 \times 10^{16}/cm^3$, and
   a concentration of said boron is not higher than $2 \times 10^{15}/cm^3$.

7. Polycrystalline diamond, comprising:
   carbon composed of any carbon isotope of $^{12}C$ and $^{13}C$; and
   a plurality of impurities,
   the polycrystalline diamond having a concentration of each of said plurality of impurities not higher than 0.01 mass % and a crystal grain size not greater than 500 nm,
   the polycrystalline diamond having Knoop hardness not lower than 140 GPa, and
   the polycrystalline diamond fabricated by sintering graphite obtained by thermal decomposition of hydrocarbon in which purity of a carbon isotope $^{12}C$ or $^{13}C$ is not lower than 99.9 mass %, at a temperature not lower than 1500° C.

8. The polycrystalline diamond according to claim 7, wherein
   a concentration of said impurities at a crystal grain boundary of said polycrystalline diamond is each not higher than 0.01 mass %.

9. The polycrystalline diamond according to claim 7, wherein
   said plurality of impurities include hydrogen, oxygen, nitrogen, silicon, and boron,
   a concentration of said hydrogen is not higher than $2 \times 10^{18}/cm^3$,
   a concentration of said oxygen is not higher than $2 \times 10^{17}/cm^3$,
   a concentration of said nitrogen is not higher than $4 \times 10^{16}/cm^3$,
   a concentration of said silicon is not higher than $1 \times 10^{16}/cm^3$, and
   a concentration of said boron is not higher than $2 \times 10^{15}/cm^3$.

* * * * *